United States Patent [19]
Wada et al.

[11] Patent Number: 5,734,666
[45] Date of Patent: Mar. 31, 1998

[54] METHOD FOR SELECTING WAVELENGTH IN WAVELENGTH-TUNABLE LASERS AND LASER OSCILLATORS CAPABLE OF SELECTING WAVELENGTHS IN WAVELENGTH-TUNABLE LASERS

[75] Inventors: Satoshi Wada; Kouichi Toyoda; Hideo Tashiro, all of Wako, Japan

[73] Assignee: Rikagaku Kenkyusho, Saitama, Japan

[21] Appl. No.: 552,515

[22] Filed: Nov. 9, 1995

[30] Foreign Application Priority Data

Nov. 10, 1994 [JP] Japan .................... 6-301372

[51] Int. Cl.$^6$ ...................................... H01S 3/10
[52] U.S. Cl. ...................... 372/20; 372/13; 372/106
[58] Field of Search ........................ 372/13, 26, 92, 372/98, 106, 9, 20; 350/372

[56] References Cited

U.S. PATENT DOCUMENTS

| | | | |
|---|---|---|---|
| 3,632,193 | 1/1972 | Kusters | 350/372 |
| 3,679,288 | 7/1972 | Harris | 359/372 |
| 3,828,276 | 8/1974 | Cohen | 372/13 |
| 3,928,814 | 12/1975 | Feichtner | 372/26 |
| 4,052,121 | 10/1977 | Chang | 350/372 |
| 4,217,036 | 8/1980 | Chang | 372/26 |
| 4,308,506 | 12/1981 | Ellis | 372/13 |
| 4,586,184 | 4/1986 | Hess | 372/13 |
| 4,630,275 | 12/1986 | Rapoport | 372/13 |
| 4,797,176 | 1/1989 | Young et al. | 372/13 |
| 4,945,539 | 7/1990 | Bagshaw | 372/13 |
| 5,193,096 | 3/1993 | Amano | 372/13 |
| 5,197,074 | 3/1993 | Emmons, Jr. et al. | 372/13 |
| 5,268,911 | 12/1993 | Young | 372/13 |

Primary Examiner—Leon Scott, Jr.

[57] ABSTRACT

In order to eliminate a mechanically movable section, such as a rotation mechanism of a diffraction grating, to achieve a compact fabrication of the whole apparatus, and to realize stable action for selecting a wavelength, a laser oscillator selecting a wavelength in a wavelength-tunable laser is composed of a laser resonator consisting of a mirror on the input side and a mirror on the output side; a laser medium which is placed in the laser resonator and can oscillate in a predetermined range of wavelengths; a crystal to which is piezoelectric element is attached, the crystal receiving acoustic waves from the piezoelectric element in accordance with a desired wavelength; and a polarizing plate which is placed in the laser resonator and transmits only the output light beam having a prescribed plane of polarization or having a prescribed direction of light propagation among the output light beams from the laser medium. The apparatus thereby outputs only the desired wavelength.

15 Claims, 4 Drawing Sheets

METHOD FOR SELECTING WAVELENGTH IN WAVELENGTH-TUNABLE LASERS AND LASER OSCILLATORS CAPABLE OF SELECTING WAVELENGTHS IN WAVELENGTH-TUNABLE LASERS

BACKGROUND OF THE INVENTION

1. Field of the Invention

The present invention relates to a method for selecting a wavelength in a wavelength-tunable laser and a laser oscillator which can select a wavelength in the wavelength-tunable laser. Applications of such a tuned laser included, for example, selecting the wavelength of a laser beam to coincide with the absorption spectrum of a desired isotope with a high precision in isotope separation, or selecting the wavelength of a laser beam to coincide with the absorption spectrum of a substance in the atmosphere with a high accuracy in order to measure a concentration of trace amounts of molecules of the substance as a laser radar.

2. Description of the Related Art

As a wavelength-tunable laser, solid state tunable lasers, for example, a Ti:Al$_2$O$_3$ (titanium-sapphire) crystal laser and the like have attracted many applications because they can oscillate in a wide wavelength range.

Heretofore, as a method for selecting a wavelength to oscillate such wavelength-tunable oscillator at a desired wavelength, there is, for example, a known wavelength selecting method for which, for example diffraction grating mirrors or birefrigent plates are arranged in the laser resonator containing a wavelength-tunable laser. Such diffraction grating mirrors or birefrigent plates are mechanically rotated, whereby the output light beam having only a desired wavelength is taken out from the possible wide wavelength-tunable range of oscillation with tunable lasers. As a result of mechanical rotation, the mirrors or plates from an optical cavity at a desired wavelength for laser oscillation.

However, in the case where such a conventional wavelength selecting method as described above is executed, the method involves such problems that it is required to constitute a rotary mechanism for rotating mechanically the diffraction grating mirrors or the birefringent plates in the laser resonator. This rotation requirement results in the whole apparatus of the mechanism becoming inevitably large-sized. Further, the reliability of selecting a wavelength is always restricted by a backlash inherent to the rotary mechanism.

OBJECT AND SUMMARY OF THE INVENTION

The present invention has been made in view of a variety of the problems involved in the prior art. An object of the present invention is to provide a method for selecting a wavelength in a wavelength-tunable laser and a laser oscillator capable of selecting a wavelength electronically in the wavelength-tunable laser by which there is no need of providing a mechanically operating section such as a rotating mechanism. The eliminator of such a rotating mechanism results in a compact design of the whole apparatus and provides a stable action for selecting a wavelength.

In order to attain the above described object, the method for selecting a wavelength in a wavelength-tunable laser and the laser oscillator capable of selecting a wavelength in a wavelength-tunable laser according to the present invention have been made in a quite different point of view from a conventional manner, wherein diffraction grating mirrors or birefringent plates are employed. More specifically, the present invention has been made as a result of noticing the fact that when acoustic waves are produced in a crystal, the plane of polarization or the angle of a propagating light beam at a specified wavelength tunes its plane of propagation or angle according to the frequency of the acoustic waves is altered.

FIG. 1 is a conceptual view illustrating a wavelength selecting function which utilizes a polarization action of the light beam having a specified wavelength by means of acoustic waves wherein incident light 102 having a wavelength $\lambda_i$ and an angular frequency $\omega_i$ is input into a crystal 100 having birefringent property, and in this condition when acoustic waves 104 each having a frequency $\omega$ are applied into the crystal 100 to obtain diffracted light 106.

More specifically, when the incident light 102 and the acoustic waves 104 are applied into the crystal 100 as described above, the wavelength $\omega_i$ of the incident light 102 shifts to the value "$\omega_o=\omega_e+\omega_i$," as a result of the interaction between the incident light 102 and the acoustic waves 104, and thus, the diffracted light 106 having the angular frequency ($\omega_o=\omega_e+\omega_i$) is obtained.

Furthermore, in this case, the phase relation "$\Delta k=k_o-k_e-k_i$" is simultaneously given wherein $k_e$ represents the wavenumber vector of the acoustic waves 104, $k_i$ represents a wavenumber vector of the incident light 102, and $k_o$ represents a wavenumber vector of the diffracted light 106 and which controls direction of the acoustic waves 104 to be applied into the diffracted light 106 is perpendicular to the incident light 102.

In the above described phase relation "$\Delta k=k_o-k_e-k_i$", an intensive diffraction appears to convert the $k_i$ wave to the $k_o$ wave by a high efficiency when the phase matching condition is satisfied, that is, $\Delta k=0$, so that the frequency of the acoustic waves 104 is adjusted so as to be $\Delta k=0$.

In the meantime, the phase matching condition "$\Delta k=0$" varies when the wavelength of the incident light 102 changes. Accordingly, when a light beam extending over a wide range of wavelength band is input, as the incident light 102, into the crystal 100, the plane of polarization is rotated in the vertical direction to the incident light 102 in respect of only the component of the incident light 102 having the frequency wherein $\Delta k=0$ is realized in a relationship with the frequency of the acoustic waves 104. Hence, when the diffracted light 106 the plane of polarization of which has been rotated in the vertical direction with respect to the incident light 102 is taken out by means of a polarizing plate 108, only the diffracted light 106 having a desired wavelength can selectively be taken out from the incident light 102 extending over the wide wavelength range.

The method for selecting a wavelength in a wavelength-tunable laser and the laser oscillator being capable of selecting a wavelength in the wavelength-tunable laser according to the present invention have been made on the basis of the above described principle. The method for selecting a wavelength in a wavelength-tunable laser capable of oscillating a laser in a predetermined range of wavelengths is characterized by placing a crystal into which have been input acoustic waves in a laser resonator; and changing the angle of a polarized light beam or an output light beam with respect to a specified wavelength in the wavelength tunable range of the wavelength-tunable laser in response to the frequency of the aforesaid acoustic waves to oscillate a laser with respect to the specified wavelength thereby to change a wavelength to be selected in response to the frequency of the acoustic waves.

The method for selecting a wavelength in a wavelength-tunable laser according to the present invention may be altered in a case in which a solid crystal is used as a laser active medium by a method for selecting a wavelength in a wavelength-tunable laser capable of oscillating a laser in a predetermined range of wavelengths is characterized by inputting acoustic waves into the crystal of the wavelength-tunable laser capable of oscillating a laser in the predetermined range of wavelengths; and constituting a laser resonator so as to resonate only with respect to a prescribed wavelength wherein the angle of a polarized light beam or an output light beam has been changed in response to the aforesaid acoustic waves thereby to oscillate the laser with respect to a specified wavelengths.

Furthermore, the laser oscillator capable of selecting a wavelength in a wavelength-tunable laser according to the present invention comprises a laser resonator being composed of opposed mirrors each having a prescribed transmissivity; a wavelength-tunable laser crystal which is placed in said laser resonator and can oscillate a laser in a predetermined range of wavelengths; a crystal which is also placed in said laser resonator and to which is inputted an output light beam from the wavelength-tunable laser; an acoustic wave input attached to the latter crystal for inputting acoustic waves to the crystal; and a polarizing means which is placed in the laser resonator and transmits only the output light beam having a prescribed plane of polarization among the output light beams from the crystal.

Furthermore, the laser oscillator capable of selecting a wavelength in a wavelength-tunable laser according to the present invention may be altered by the one which comprises a laser resonator being composed of opposed mirrors each having a prescribed transmissivity; a wavelength-tunable laser which is placed in said laser resonator and can oscillate a laser in a predetermined range of wavelengths, besides to which is attached an acoustic wave inputting means; and a polarizing means which is placed in said laser resonator and transmits only the output light beam having a prescribed plane of polarization among the output light beams from said wavelength-tunable laser.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
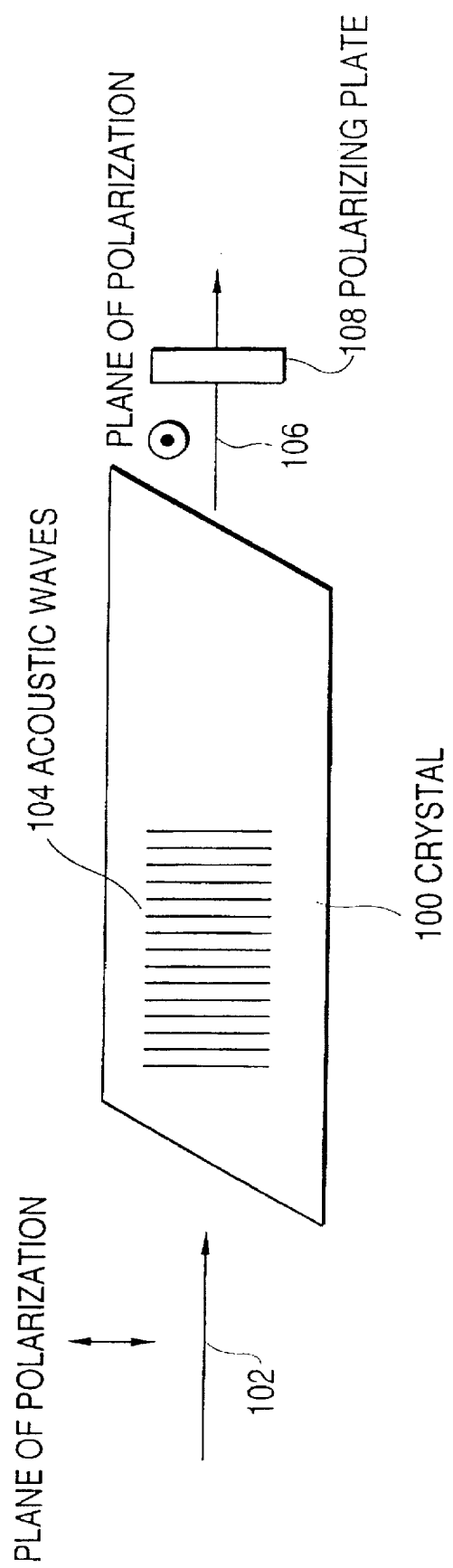
FIG. 1 is a conceptual diagram illustrating a wavelength selecting function which utilizes a polarization action of the light beam having a specified wavelength by means of acoustic waves.

In addition to the general concept of the present invention discussed above in relation to FIG. 1, embodiments of the method for selecting a wavelength in a wavelength-tunable solid state laser and the laser oscillator capable of selecting a wavelength in the wavelength-tunable solid state laser according to the present invention will be described in detail hereinbelow in conjunction with the accompanying drawings.

Figure 2:
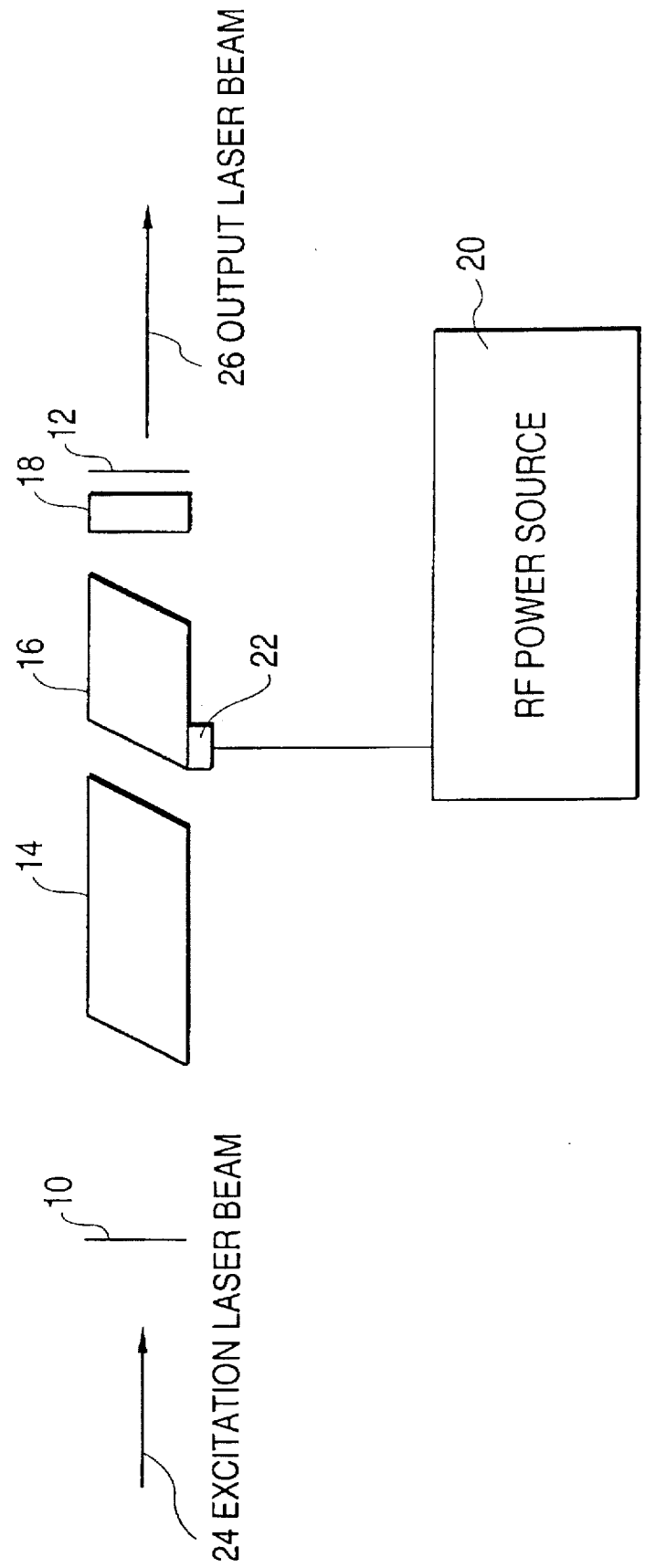
FIG. 2 is a schematic constitutional diagram for explaining the laser oscillator capable of selecting a wavelength in a wavelength-tunable solid state laser for embodying the method for selecting a wavelength in the wavelength-tunable solid state laser according to the first embodiment of the present invention.

In FIG. 2, illustrated in a schematic constitutional diagram for explaining the laser oscillator capable of selecting a wavelength in a wavelength-tunable solid-state laser (hereinafter referred to simply as "laser oscillator") for embodying the method for selecting a wavelength in the wavelength-tunable solid state laser according to the first embodiment of the present invention.

In the lasers oscillator, a laser resonator is composed of a mirror 10 on the input side and a mirror 12 on the output side, both of the mirrors each having a prescribed transmissivity.

In the laser resonator, a Ti:$Al_2O_3$ laser crystal 14 as the wavelength-tunable solid state laser, a crystal for selecting a wavelength 16, and a polarizing plate 18 are successively placed in this order from the mirror 10 on the inputting side towards the mirror 12 on the outputting side.

Further, to the crystal for selecting a wavelength 16 is attached a piezoelectric element 22 driven by an RF power source as an acoustic wave input. Accordingly, when the piezoelectric element 22 is driven by the RF power source 20 to produce a strain, acoustic waves each having a frequency corresponding to the strain of the piezoelectric element are input to the crystal for selecting a wavelength 16 on the basis of the strain of the piezoelectric element 22.

Moreover, the polarizing plate 18 is arranged in such that only the light beam having a prescribed plane of polarization is transmitted through.

Furthermore, the piezoelectric element 22 inputs acoustic waves to the crystal for selecting a wavelength 16 in such a manner that the plane of polarization of the output light beam having the wavelength of an output laser beam 26 which is intended to output from the mirror 12 on the outputting side becomes a prescribed plane of polarization which transmits through the polarizing plate 18.

In the above arrangement, the Ti:$Al_2O_3$ laser crystal 14 is excited by using the second harmonic of a Nd:YAG laser as excitation laser beam 24. On the other hand, the frequency of the RF power source 20 is controlled in response to the wavelength of the output laser beam 26 which is intended to output from the mirror 12 on the output side based on the above described principle, whereby the piezoelectric element 22 is driven.

According to the above described arrangement, the plane of polarization of an output light beam having the wavelength in response to the frequency of the RF power source 20 is rotated among light beams input to the crystal for selecting a wavelength 16, i.e. the output light beams extending over a wide range of wavelengths which are output from the Ti:$Al_2O_3$, laser crystal 14, whereby the prescribed plane of polarization is attained, and the resulting light beam is outputted from the crystal for selecting a wavelength 15. Thus, only the output light beam having the above described prescribed plane of polarization among the output light beams output from the crystal for selecting a wavelength 16 is transmitted through the polarizing plate 18, the light beam thus transmitted is reflected by the mirror 12 on the outputting side, and as a result the light beam reciprocates in the laser resonator. Consequently, only the light beam having the aimed frequency is amplified to produce a laser oscillation, whereby only the output laser beam 26 having a desired wavelength can be outputted from the laser resonator.

Figure 3:
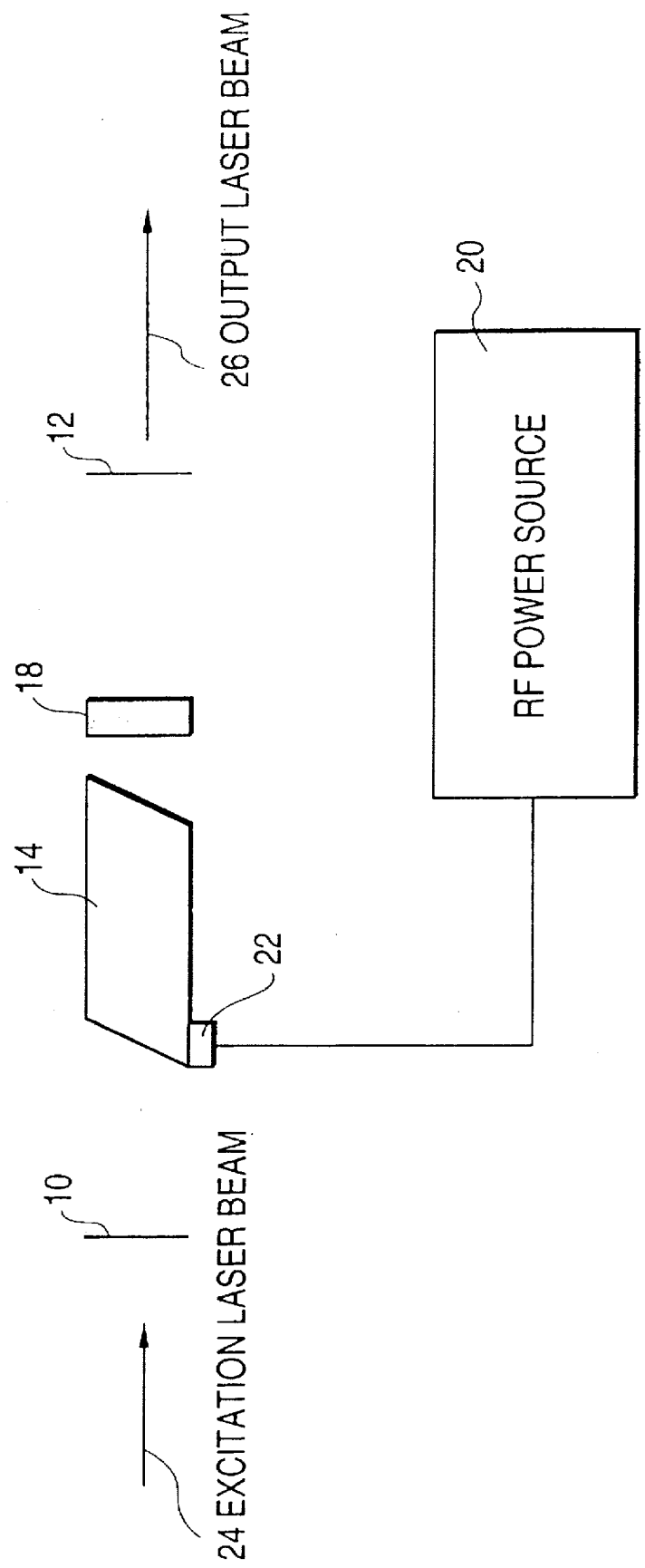
FIG. 3 is a schematic constitutional diagram for explaining the laser oscillator capable of selecting a wavelength in a wavelength-tunable solid state laser for embodying the method for selecting a wavelength in the wavelength-tunable solid state laser according to the second embodiment of the present invention.

Furthermore, illustrated in FIG. 3 is a schematic constitutional diagram for explaining the laser oscillator according to the second embodiment of the present invention wherein the same components as that of the first embodiment are designated by the same reference numerals as that of the former embodiment.

More specifically, in also the laser oscillator according to the second embodiment, a laser resonator is composed of a mirror 10 on the input side and a mirror 12 on the output side, both of the mirrors each having a prescribed transmissivity as same as in the laser oscillator of the first embodiment.

In the laser resonator, a Ti:Al$_2$O$_3$ laser crystal 14 as the wavelength-tunable solid state laser and a polarizing plate 18 are successively placed from the mirror 10 on the input side towards the mirror 12 on the output side.

Further, to the Ti:Al$_2$O$_3$ laser crystal 14 is attached a piezoelectric element 22 driven by an RF power source as an acoustic wave inputting means. Accordingly, when the piezoelectric element 22 is driven by the RF power source 20 to produce a strain, acoustic waves each having a frequency corresponding to the strain of the piezoelectric element are inputted to the Ti:Al$_2$O$_3$ laser crystal 14 on the basis of the strain of the piezoelectric element 22.

Moreover, the polarizing plate 18 is arranged as in the first embodiment in such that only the light beam having a prescribed plane of polarization is transmitted to constitute a laser cavity wherein the piezoelectric element 22 inputs acoustic waves to the Ti:Al$_2$O$_3$ laser crystal 14 in such a manner that the plane of polarization of the output light beam having the wavelength of an output laser beam 26 which is intended to output from the mirror 12 on the outputting side becomes a prescribed plane of polarization which transmits through the polarizing plate 18.

In the above arrangement, the Ti:Al$_2$O$_3$ laser crystal 14 is excited by using the second harmonic of a Nd:YAG laser as excitation laser beam 24. On the other hand, the frequency of the RF power source 20 is controlled in response to the wavelength of the output laser beam 26 which is intended to output from the mirror 12 on the output side based on the above described principle, whereby the piezoelectric element 22 is driven.

According to the above described arrangement, only the plane of polarization of the output light beam having a wavelength in response to the frequency of the RF power source is rotated among the output light beams extending over a wide range of wavelengths which are output from the Ti:Al$_2$O$_3$ laser crystal 14, whereby the resulting light beam is output. Thus, only the output light beam which is outputted from the Ti:Al$_2$O$_3$ laser crystal 14 and the plane of polarization of which has been rotated in transmitted through the polarizing plate 18, the light beam thus transmitted is reflected by the mirror 12 on the output side, and as a result the light beam reciprocates in the laser resonator. Consequently, only the light beam having the aimed frequency is amplified to produce a laser oscillation, whereby only the output laser beam 26 having a desired wavelength can be output from the laser resonator.

Figure 4:
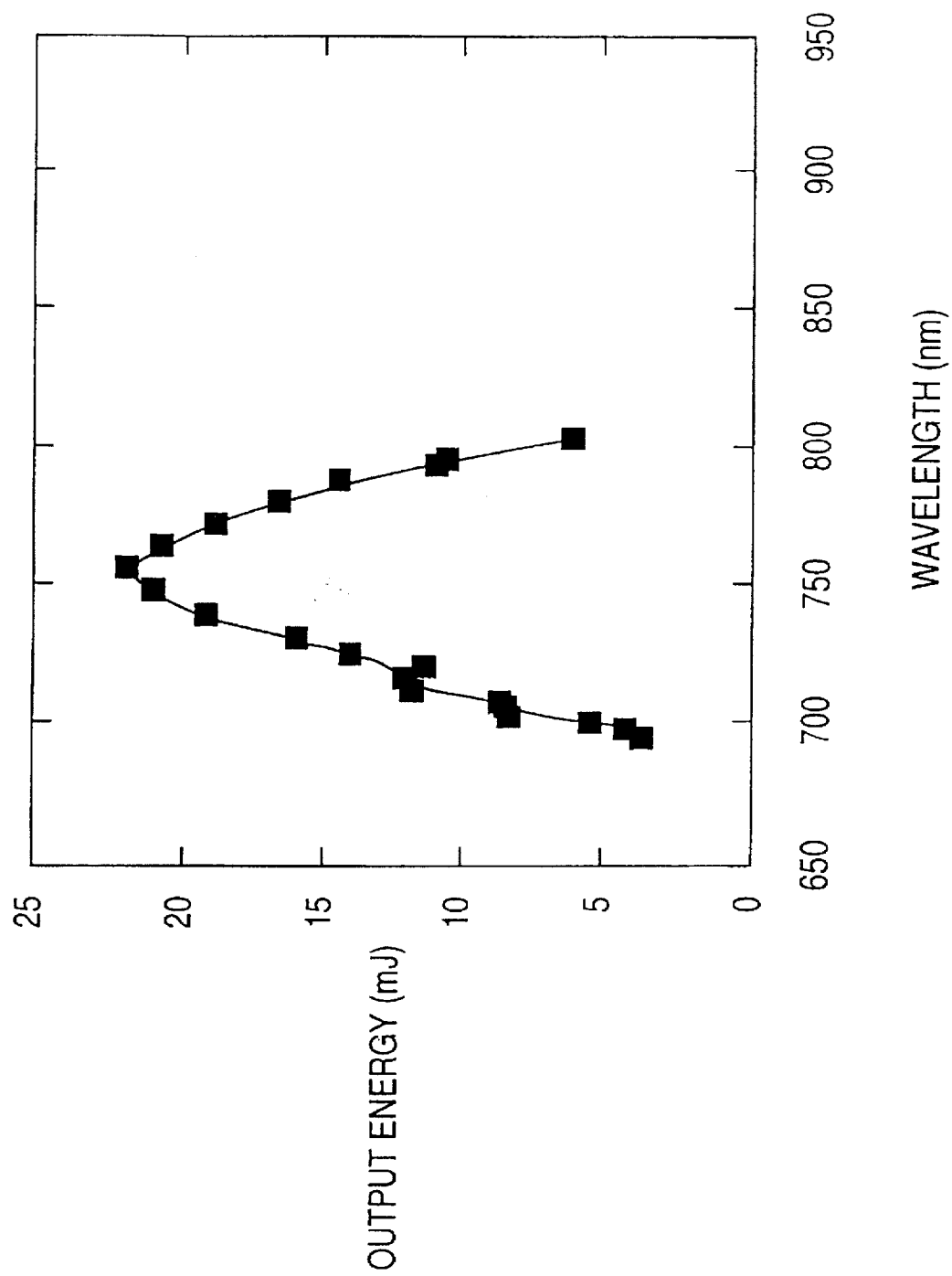
FIG. 4 is a graphical representation indicating a relationship between output energies and wavelengths of an output laser beam in the case when a frequency of an RF power source is varied in an experiment where the laser oscillator shown in the second embodiment is used.

FIG. 4 is a graphical representation showing the results of an experiment which was conducted by employing the laser oscillator illustrated in the first embodiment under the following experimental conditions. The graph indicates a relationship between the outputs and the wavelengths of the output laser beam 26 in the case when a frequency of the RF power source 20 is changed. As is apparent from the experimental results shown in FIG. 4, the laser oscillator according to the present invention can effect laser oscillation with an arbitrarily selected wavelength so far as the wavelength is within a range of from about 700 nm to about 800 nm.

(Experimental Conditions)
Excitation Laser Beam 24: Second Harmonic of a pulsed Nd:YAG
 Laser, Wavelength 532 nm, Energy 100 mJ,
 Pulse Width 8 ns
Mirror on Input Side: 99% Reflection
Mirror on Reflecting Side: 30% Reflection at 755 nm Wavelength
RF Power Source: Frequency Variable Range 40 MHz~150 MHz Input Electric Power 1 W While the explanation has been made on the case where the plane of polarization is rotated by means of acoustic waves produced by the piezoelectric element 22 in the above described embodiment, it may be modified in such that the direction of acoustic waves produced by the piezoelectric element 22 and which are to be applied to the crystal for selecting a wavelength 16 or the Ti:Al$_2$O$_3$ laser crystal 14 is controlled, whereby an output angle of the output light beam having a specified frequency in response to the wavelength of the acoustic waves is changed among the output light beams outputted from the crystal for selecting a wavelength 16 or the Ti:Al$_2$O$_3$ laser crystal 14.

Furthermore, it is to be noted that the present invention is also applicable to the other wavelength-tunable lasers such as a dye laser.

Since the present invention is constructed as described above, the wavelength of an output laser beam can be selected with provision of no mechanically operation section, such as a rotating mechanism. Therefore, in accordance with the present invention, down-sizing of the whole apparatus can be achieved and stable operation for selecting a wavelength can be realized.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for outputting a desired wavelength from a wavelength-tunable laser having a laser resonator, the wavelength-tunable laser oscillating in a predetermined range of wavelengths, comprising the steps of:

placing a crystal in the laser resonator;

supplying acoustic waves to the crystal; and changes an angle of a diffracted beam direction output from the crystal including controlling the direction of said acoustic waves, osicllating the laser with respect to a diffracted beam direction at the desired wavelength, thereby shifting an output of the wavelength-tunable laser to the desired wavelength.

2. The method as claimed in claim 1, further comprising using the crystal as a laser crystal in the wavelength tunable laser.

3. A method for outputting a desired wavelength from a wavelength-tunable laser, the wavelength tunable laser having a laser resonator and including a laser crystal oscillating in a predetermined range of wavelengths, comprising the steps of:

inputting acoustic waves into the laser crystal of the wavelength-tunable laser; and configuring the laser resonator so as to output only the desired wavelength, including changing at least one of the angle of a polarization light beam and an angle of a diffracted light beam direction output from the laser crystal in response to said acoustic waves.

4. A laser oscillator for outputting a selected wavelength in a predetermined range of wavelengths generated in a wavelength-tunable laser comprising:

a laser resonator including opposed mirrors each having a prescribed transmissivity;

a crystal which is placed in the laser resonator, said crystal receiving the predetermined range of wavelengths;

an acoustic wave inputting means attached to said crystal for, delivering acoustic waves to said crystal;

means for controlling the direction of the acoustic waves for altering a diffracted beam direction output from said crystal; and means for oscillating the laser in accordance with a diffracted beam direction of the selected wavelength, thereby outputting the selected wavelength from the resonator.

5. The laser oscillator as claimed in claim 4, wherein said crystal is a Ti:Al$_2$O$_3$ laser crystal.

6. The laser oscillator as claimed in claim 5, wherein said acoustic wave inputting means is a piezoelectric element which is driven by an RF power source.

7. The large oscillator as claimed in claim 4, wherein said acoustic wave inputting means is a piezoelectric element which is driven by an RF power source.

8. A laser oscillator for outputting a desired wavelength in a predetermined range of wavelengths in a wavelength-tunable laser comprising:

a laser resonator including opposed mirrors each having a prescribed transmissivity;

a crystal which is placed in said laser resonator oscillates in the predetermined range of wavelengths;

an acoustic wave inputting means for supplying acoustic waves to said crystal; and a polarizing means placed in said laser resonator for transmitting only an output light beam having a prescribed plane of polarization among light beams output from said crystal, thereby outputting said light beams from said laser oscillator only at a desired wavelength.

9. The laser oscillator as claimed in claim 8, wherein said crystal is a Ti:Al$_2$O$_3$ laser crystal.

10. The laser oscillator capable as claimed in claim 9, wherein said acoustic wave inputting means is a piezoelectric element which is driven by an RF power source.

11. The laser oscillator as claimed in claim 8, wherein said acoustic wave inputting means is a piezoelectric element which is driven by an RF power source.

12. A laser oscillator outputting a desired wavelength in a predetermined range of wavelengths output by a wavelength-tunable laser comprising:

a laser resonator including opposed mirrors each having a prescribed transmissivity;

a crystal placed in said laser resonator which oscillates in the predetermined range of wavelengths;

an acoustic wave inputting means for inputting acoustic waves to said crystal;

means for controlling the direction of said acoustic waves, thereby changing an angle of a diffracted beam direction output from the crystal;

means for oscillating the laser at a diffracted beam direction of the desired wavelength, wherein one of said opposed mirrors allows the desired wavelength to be output from the laser resonator.

13. The laser oscillator as claimed in claim 12 wherein said crystal is a Ti:Al$_2$O$_3$ laser crystal.

14. The laser oscillator as claimed in claim 13, wherein said acoustic wave inputting means is a piezoelectric element which is driven by an RF power source.

15. The laser oscillator as claimed in claim 12, wherein said acoustic wave inputting means is a piezoelectric element which is driven by an RF power source.

* * * * *